United States Patent [19]  
Flowers

[11] Patent Number: 4,633,803  
[45] Date of Patent: Jan. 6, 1987

[54] TACHOMETER

[75] Inventor: John P. Flowers, Skagit County, Wash.

[73] Assignee: Bayliner Marine Corporation, Seattle, Wash.

[21] Appl. No.: 787,532

[22] Filed: Oct. 15, 1985

[51] Int. Cl.⁴ ............................................. G01D 13/02
[52] U.S. Cl. ................................... 116/334; 116/62.4; 116/303
[58] Field of Search ................ 40/594, 595, 627, 630; 73/112, 113, 117.3, 115, 114; 116/202, 286, 304, DIG. 35, DIG. 36, 334, 335, 62–62.4, 303, 305; 340/52 F, 671; D10/78, 98, 102, 122–125

[56] References Cited  
U.S. PATENT DOCUMENTS

| 2,450,835 | 10/1948 | Lee, 2nd | 73/112 |
| 2,520,028 | 8/1950 | Biskind | 116/202 |
| 3,276,418 | 10/1966 | Harris | 116/62.1 |
| 3,440,870 | 4/1969 | Leto | 73/115 |
| 3,921,569 | 11/1975 | Miller et al. | 116/286 |

FOREIGN PATENT DOCUMENTS  
764857 1/1957 United Kingdom ................ 73/113

Primary Examiner—Charles Frankfort  
Assistant Examiner—W. Morris Worth  
Attorney, Agent, or Firm—Seed and Berry

[57] ABSTRACT

An instrument gauge is described of the pointer output type, especially a tachometer, that includes a display cover limiting observation of the pointer by a first window cut into the cover in the shape of a graphical representation of a proportional relationship between engine performance and revolutions per minute or vehicle speed. The window is oriented such that the pointer position indicates RPM or speed on a cover scale. Engine performance is indicated by the relative position of the pointer with respect to the curved shape of the window established by the proportional relationship. The cover includes a second window of such size and orientation that it permits observation of the pointer only when a critical RPM or speed is reached. A flag fixed to the pointer appears in the second window only at the critical value.

10 Claims, 4 Drawing Figures

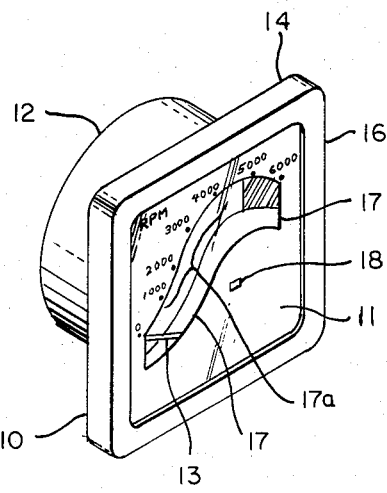
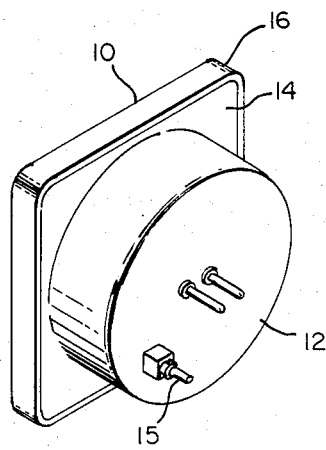
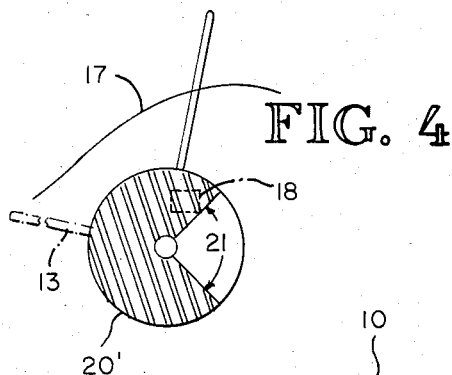
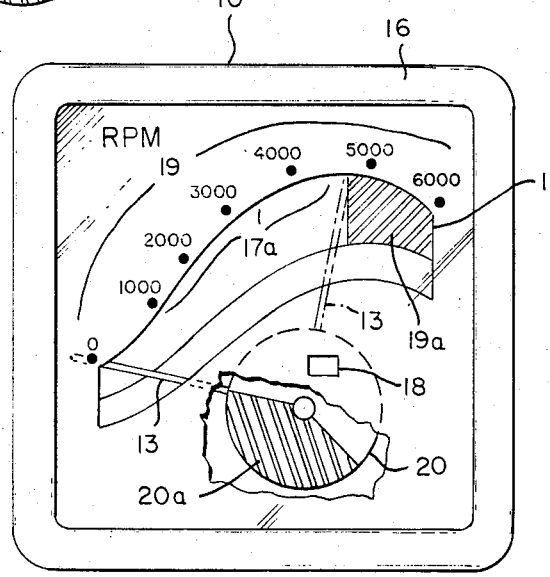

TACHOMETER

TECHNICAL FIELD

The field of invention is engine instrumentation. More particularly, the invention relates to instrumentation displays which improve operator understanding of engine performance in relation to instrument output.

BACKGROUND ART

Engine instrumentation is most useful when readings are readily translatable into information that helps the operator operate efficiently and safely. Where the importance of continual and reliable engine performance is high, such as in airplanes, boats or the like, accurate and useful information becomes critically important to the safety of operators and passengers. Typically, as the need for better information increases, instrumentation becomes more complex and less familiar to inexperienced operators. In many situations, instrumentation may offer information in a form that, while clearly readable, has little or no meaning to the inexperienced operator.

A simple example of such instrumentation is the tachometer, reporting engine performance in terms of output shaft revolutions per minute (RPMs), which is familiar in boats, airplanes, and high-performance automobiles. While the neophyte operator of the more complex engine systems may know that it is dangerous to run an engine at an excessive RPM level, and that the tachometer output is somehow related to speed, he may not know the nature of the relationship between engine RPMs and the power output of the engine. Since engines differ somewhat in their power operating curves, even an experienced operator may not understand the exact relationship, for a particular engine type, between efficient levels of performance and various RPM settings. For both operators, it would be useful if the instrument and its means of display informed the operator not only of the actual operating value measured, but also how the particular reading relates to critical matters of operating safety and efficiency.

DISCLOSURE OF THE INVENTION

It is an object of the present invention to provide an engine instrument including a pointer output and a display cover which not only reports the parameter actually measured, but graphically relates the indicated reading to a second parameter important to efficient and safe operation of said engine.

It is a further object of the instrument of this invention to provide a mechanism for reporting an important third parameter, which, while of intermittent importance, relates, for example, to the safety of operating the engine.

The display cover of the invention limits observation of the instrument output pointer positioning by means of special viewing windows. A first display window is cut into the cover in the form of a curved band or slot wherein the shape of the curve is a graphical representation of a proportional relationship between a first parameter of interest and a second parameter of interest. The first window is oriented with respect to the gauge output pointer such that the first, actually measured parameter is directly reported by a pointer position with respect to a conventional scale, typically on the cover. The second parameter of interest is reported by the pointer position relative to the shape of the window curve.

A second display window in the cover is limited to reporting a narrow range of pointer positions comprising a third parameter of interest. The second window is located and oriented with respect to the pointer output such that the third parameter is reported by the pointer intermittently and only when the third parameter becomes significant.

The display cover of the invention is particularly useful for tachometers of the pointer output type, where the first parameter of interest is revolutions per minute of the engine or miles per hour speed of a vehicle and the second parameter is power output or efficiency of performance of an engine.

The cover of the invention is particularly useful where the third parameter of interest is a warning that the level of revolutions per minute is in an inefficient or dangerous range. The third parameter is reported by the appearance of a flag means fastened to the pointer such that it appears in the second window only when the RPMs exceed a certain critical level.

In a preferred embodiment, the pointer includes a flag that is a disk fixed to the pointer such that the disk rotates into view through the second window during operation of the gauge. A section is removed from the disk whereby the disk flag is not viewable through the second window when the pointer readings coinciding with the removed portion of the disc are produced. The disk is only viewable when "critical" pointer readings, coinciding with the full disk portion, are produced. In a second preferred embodiment, the disk will include contrasting colors, with an intense red or the like color rotating into view at critical ranges.

BRIEF DESCRIPTION OF THE DRAWINGS

FIG. 1 is an isometric drawing of a tachometer instrument and display cover of the invention.

FIG. 2 is an isometric drawing of the rear of the gauge of FIG. 1.

FIG. 3 is an elevational view of the display cover of the invention, showing the tachometer gauge of FIG. 1.

FIG. 4 shows a warning flag embodiment of the invention.

BEST MODE FOR CARRYING OUT THE INVENTION

Referring to FIGS. 1 and 3, a preferred embodiment of the invention, including a tachometer gauge 10 for sensing and reporting an engine output in terms of revolutions per minute (RPM), is depicted. The gauge display cover 11 of the invention, designed for reporting performance parameters related to actually measured engine revolutions per minute, is likewise shown.

The gauge 10 includes a housing 12 for containing a gauge mechanism (not shown in detail) having an output pointer 13. The housing includes a mounting flange 14 for securing the gauge to, for example, a bulkhead. A gauge pressure port fitting 15 receives an RPM signal via a transducer sensor from the remote engine, neither of which is shown since both are conventional. The cover display plate means 11 of the invention is attached to the mounting flange 14 by means of a retaining ring 16.

The gauge mechanism is of a conventional type whereby a transducer senses the value to be measured, such as revolutions per minute, or a related value translated into miles per hour. The transducer transforms the measured parameter, RPMs, into a pressure differential which is transmitted to the instrument. The instrument is typically of the Bourdon tube gauge type, including a closed end tube bent in an arc of a circle which deflects as pressure varies. The deflection of the tube is transferred through gear means to a pointer which rotates in response to pressure changes. A scale is provided in terms of the parameter of interest for indicating parameter value.

The cover plate 11 limits observation of the pointer 13 to two viewing windows 17, 18. The first viewing window 17 is cut into said cover 11 in the form of a curved band or slot. The shape or trace of the top edge 17a of the curved viewing window is a graphical representation of the proportional relationship between engine power output or efficiency and engine revolutions per minute. The band window 17 is of sufficient length and width to permit observation of the pointer 13 at all significant output levels. The window is oriented with respect to the pointer element 13 such that the number of revolutions per minute is reported by the position of the pointer with respect to a gauge scale 19, here calibrated in RPMs.

The power output or efficiency of the engine is reported by pointer position on the curved top edge 17a of the curved window 17. Referring to FIG. 3, it is seen that the relationship between RPMs and power output is nonlinear. That is, as engine RPM increases between zero and 6,000 RPMs, the engine power output increases fairly steeply up to about 3,500 RPMs and then levels off and begins to decline at 5,000 RPMs. The cross-hatched portion 19a on the scale indicates the declining power region to an operator very clearly.

In the case of the tachometer cover 11, shown in FIG. 1, determination of the efficient point of operation is easily estimated. In other instrument applications, it may be advantageous to include a vertical scale for estimating actual values of the nonlinear parameter of interest. In operating an engine using the tachometer of FIG. 3, it is easy to identify approximate peak operating conditions at about 4,000 to 4,500 RPMs.

The tachometer cover 11 of the invention is provided with a second viewing window 18 cut into the cover. The second window 18 permits observation of the pointer 13 only when engine RPMs achieve a critical value of interest. Referring to FIG. 3, the window 18 is located and oriented to permit reporting observations only when the revolutions per minute enter the inefficient range or a range which may be adverse to safe operation of the engine.

Reporting of critical values is achieved by means of a disk flag element 20 that is attached to the pointer 13 such that it appears in the second window 18. The warning signal is a segment of color 20a on the disk that rotates into view in the window 18 only when the critical values are achieved. The remaining segment of the disk 20 is a color that is substantially indistinguishable from the background color of the cover. The window 18 must be located and oriented such that the disk color rotates into view only when critical values are achieved.

In another embodiment, as shown in FIG. 4, the disk 20 will have a peripheral portion 21 of the disk 20' cut away such that, as the pointer 13 rotates through conventional operating ranges, the cutout portion 21 is adjacent the second window 18. The cutout 21 is limited so that when the pointer 13 reaches about 4,800 RPMs, the remaining portion of the disk 20' begins appearing in the window, indicating that the critical RPM value has been reached.

The instrument and display cover of the invention are not limited to tachometers only, but may be adapted to any gauge where it is desired to relate an output whose meaning is not well understood to a more commonly known parameter. The invention is particularly useful where there is a nonlinear relationship between the parameters of interest that can be graphically demonstrated, such as between a measured output number and a more commonly understood parameter which is important to operation of the system.

I claim:

1. A gauge for measuring a first parameter of interest and indicating a value for said first parameter and also a value for a second parameter of interest that is related to the first parameter, comprising:

a gauge including a pointer indicator, said gauge receiving a signal related to said first parameter whereby said pointer is relatively positioned in response to said signal to indicate said first parameter value; and a display cover that includes a scale for indicating values of said first parameter for each pointer position and also substantially obstructs observation of said pointer position, said cover further including a display window, said scale adjacent thereto, said window permitting limited observation of each pointer position, said window including an edge that is contoured to a shape of a curve that represents a proportional relationship between said first and said second parameters of interest such that each pointer position indicates a value of the first parameter by reference to said scale and a value for said second parameter by reference to the pointer position relative to the shape of the contoured window edge.

2. The gauge of claim 1, said cover including a second display window, said second window limited to displaying a narrow range of pointer positions comprising a third parameter of interest wherein said window location and orientation with respect to said pointer position is such that said third parameter is reported by said pointer intermittently only when said third parameter exceeds a value of interest.

3. The gauge of claim 1 wherein said gauge is an engine tachometer and said first parameter of interest is revolutions per minute and said second parameter of interest is power output of said engine.

4. The gauge of claim 2 wherein said gauge is an engine tachometer, said first parameter is revolutions per minute and said third parameter of interest is a warning of a level of revolutions per minute that is inefficient for said engine and said third parameter is reported by the appearance of a flag means in said second window.

5. A display cover for a vehicle-mounted tachometer of the type including a pointer output, said cover substantially obstructing observation of said pointer, but including windows permitting limited viewing of said pointer, said cover comprising:

a first viewing window in said cover in the form of a curved band, said window including an edge similar to a shape of a curve representing a proportional relationship between engine output and vehicle speed, said window band of sufficient length and width to permit observation of pointer positions at all output levels, wherein said window is located and oriented relative to said pointer output such that speed is indicated by the position of the pointer with respect to a gauge scale adjacent said window while said power output is indicated by the pointer position relative to the curve shape of the said curved band window; and a second viewing window in said cover through which said pointer may be observed only when an engine speed or efficiency parameter achieves a critical value, said window oriented and located to indicate only when said critical parameter is achieved.

6. The cover of claim 5 wherein said vehicle is a boat.

7. The cover of claim 5 wherein the pointer indicates a critical parameter value in said second window by means of a flag means attached to said pointer, which flag means appears in said second window only as the pointer reaches said critical value.

8. The gauge of claim 1 wherein a top edge of said window is contoured to the shape of a curve representing the proportional relationship between said first and second parameters and said scale is adjacent said window top edge.

9. The cover of claim 7 wherein said flag means is a disk fixed to said pointer that rotates as said pointer rotates, said disk including a peripheral arcuate portion that only rotates into view through said second window to indicate said critical parameter.

10. The cover of claim 7 wherein said flag means is a disk fixed to said pointer that rotates as said pointer rotates, said disk including a peripheral arcuate portion that includes a color contrasting with the color of background of said gauge wherein said color is observable through said second window only to indicate said critical parameter.

* * * * *